US009459701B2

(12) United States Patent
Berglund et al.

(10) Patent No.: US 9,459,701 B2
(45) Date of Patent: Oct. 4, 2016

(54) KEYBOARD AND TOUCH SCREEN GESTURE SYSTEM

(71) Applicant: BLACKBERRY LIMITED, Waterloo (CA)

(72) Inventors: Carl Fredrik Alexander Berglund, Malmo (SE); Dan Zacharias Gärdenfors, Malmo (SE); Emil Alexander Wasberger, Landskrona (SE)

(73) Assignee: BlackBerry Limited, Waterloo, Ontario (CA)

( * ) Notice: Subject to any disclaimer, the term of this patent is extended or adjusted under 35 U.S.C. 154(b) by 5 days.

(21) Appl. No.: 13/923,857

(22) Filed: Jun. 21, 2013

(65) Prior Publication Data

US 2014/0375568 A1    Dec. 25, 2014

(51) Int. Cl.
*G06F 3/02* (2006.01)
*G06F 3/0489* (2013.01)
*G06F 3/0488* (2013.01)

(52) U.S. Cl.
CPC ......... *G06F 3/0227* (2013.01); *G06F 3/04883* (2013.01); *G06F 3/04897* (2013.01)

(58) Field of Classification Search
USPC ........ 345/173, 163, 168, 684, 157; 455/566; 715/784, 856
See application file for complete search history.

(56) References Cited

U.S. PATENT DOCUMENTS

| | | | |
|---|---|---|---|
| 8,373,673 B2* | 2/2013 | Shiplacoff | G06F 3/0416 345/156 |
| 2010/0105438 A1* | 4/2010 | Wykes et al. | 455/566 |
| 2010/0185989 A1* | 7/2010 | Shiplacoff | G06F 3/0416 715/856 |
| 2010/0245246 A1* | 9/2010 | Rosenfeld et al. | 345/163 |
| 2012/0206363 A1* | 8/2012 | Kyprianou et al. | 345/168 |
| 2012/0216143 A1* | 8/2012 | Shiplacoff | G06F 3/0416 715/784 |
| 2013/0187957 A1* | 7/2013 | Andersson Reimer et al. | 345/684 |
| 2014/0267029 A1* | 9/2014 | Govil | G06K 9/00355 345/157 |
| 2014/0327636 A1* | 11/2014 | Day et al. | 345/173 |

* cited by examiner

*Primary Examiner* — Thuy Pardo
(74) *Attorney, Agent, or Firm* — Jon A. Gibbons; Fleit Gibbons Gutman Bongini Bianco PL

(57) ABSTRACT

A method at an electronic device including a touch-sensitive display for receiving touch input and a keyboard comprising a plurality of buttons, the method comprising: detecting actuation of a button on at least one of the plurality of buttons; detecting a touch input at the touch-sensitive display while the button is actuated; responding to the touch input, wherein response to the touch input while the button is actuated is different to response to touch input detected while the button is not actuated.

25 Claims, 7 Drawing Sheets

KEYBOARD AND TOUCH SCREEN GESTURE SYSTEM

FIELD OF THE TECHNOLOGY

The present disclosure relates to electronic devices, methods of operation thereof, and computer software for facilitating user control the device. In particular, the present disclosure provides ways of providing user input to electronic devices.

BACKGROUND

Electronic devices, including portable electronic devices, have gained widespread use and may provide a variety of functions including, for example, telephonic, electronic messaging and other personal information manager (PIM) application functions. Portable electronic devices include, for example, several types of mobile stations such as simple cellular telephones, smart phones, wireless personal digital assistants (PDAs), and laptop computers with wireless 802.11 or Bluetooth capabilities.

Portable electronic devices such as PDAs or smart telephones are generally intended for handheld use and ease of portability. Smaller devices are generally desirable for portability. A touch-sensitive display, also known as a touch-screen display, is particularly useful on handheld devices, which are small and have limited space for user input and output. The information displayed on the touch-sensitive displays may be modified based on the functions and operations being performed.

Portable electronic devices have also included dedicated keyboards or keypads comprising clickable buttons for providing user input. Such physical keyboards provide a tactile feedback that is not always possible in touch-sensitive displays. Given the limited size of portable electronic devices, there is often a compromise between the amount of space on the device available for physical buttons and the amount of space available for a touch-sensitive device.

Improvements in devices with touch-sensitive displays and keyboards are desirable.

BRIEF DESCRIPTION OF DRAWINGS

Examples of the present proposed approach will now be described in detail with reference to the accompanying drawings, in which.

DETAILED DESCRIPTION

Figure 1:
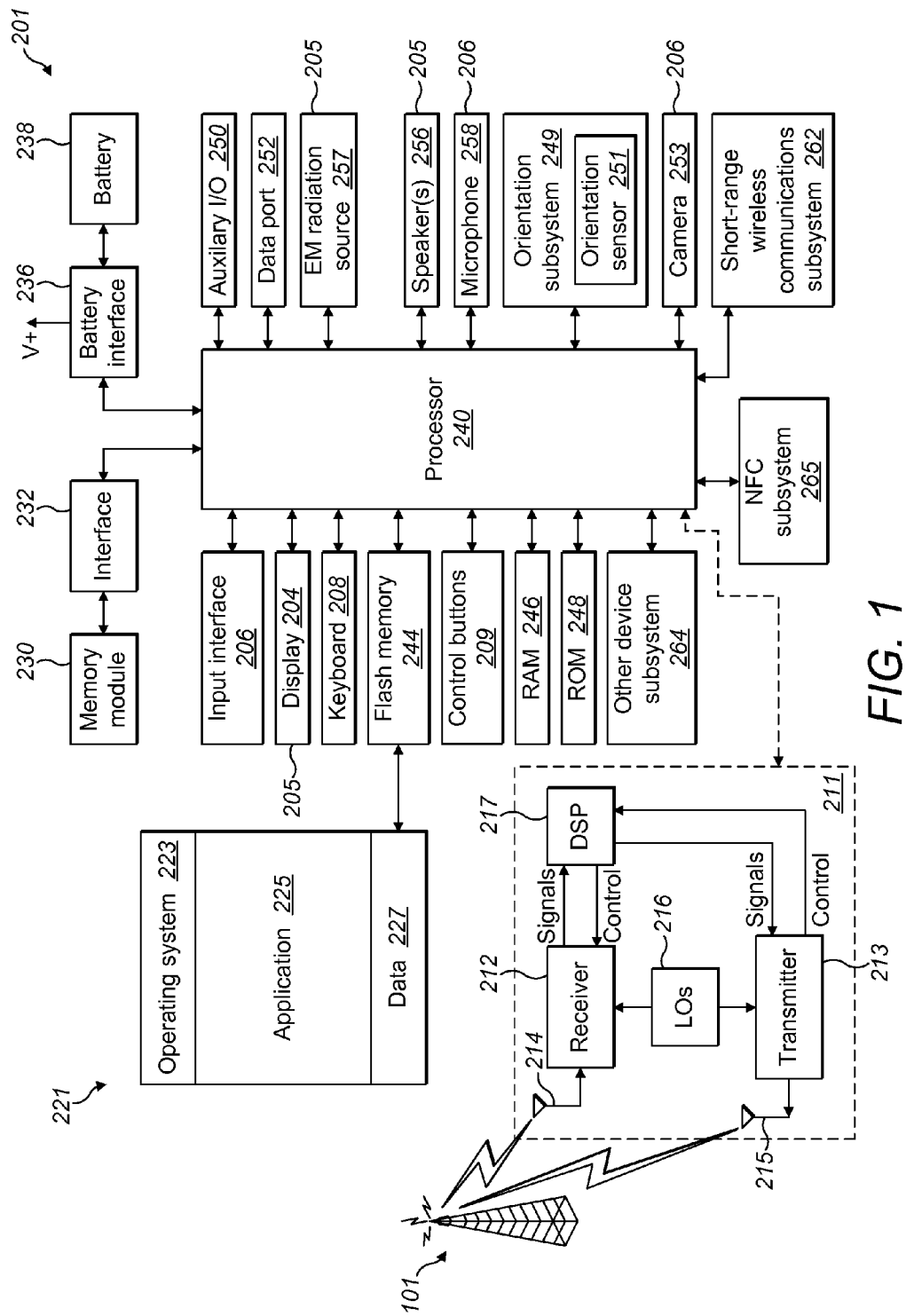
FIG. 1 is a block diagram illustrating an electronic device in accordance with example embodiments of the present disclosure.

In one embodiment, the present disclosure provides a method at an electronic device including a touch-sensitive display for receiving touch input and a keyboard comprising a plurality of buttons, the method comprising: detecting actuation of a button on at least one of the plurality of buttons; detecting a touch input at the touch-sensitive display while the button is actuated; responding to the touch input, wherein response to the touch input while the button is actuated is different to response to touch input detected while the button is not actuated.

The proposed solution provides a way of interacting with an electronic device by combining touch input on a touch-sensitive display, and keyboard input by actuating one or more buttons on a keyboard portion of the device. Such a solution thereby ensures a maximum utility of the components available.

The proposed solution allows the user to use the keyboard as an extension of the touch-sensitive display, not simply to provide text input, but also to provide additional input options to be used in conjunction with the touch-sensitive display.

When touch sensitive input is received on its own, the electronic device is configured to respond in one way, but if the touch input is detected at the same time as certain keyboard keys are actuated, the response to the touch input is modified such that it is treated as a different touch input, thereby providing a different response. This allows a larger amount of possible user interactions while using the same touch gesture, thereby allowing faster interactions.

In some example embodiments the response to the touch input while the button is actuated is dependent on which of the plurality of buttons is actuated. While the act of pressing any button on the keyboard may act as a modifier of the touch input, by providing different responses based on which of the keyboard buttons are pressed provides a greater number of possible response to the same touch input.

In some example embodiments the response to the touch input while the button is not actuated is performing a first action on a content item, and the response to the touch input while the button is not actuated comprises performing a second action on the content item. When touch input is received without a corresponding keyboard press, the devices performs one action to a content item, but the action will be different if a keyboard button is actuated while the touch input is received. For example, a tap on a content item alone may select it, but a tap on it while holding the delete keyboard button may delete it instead.

In some example embodiments the first action is a selection of the content item, and the second action is a flagging of the content item.

In some example embodiments the touch input is a pinch gesture, and the response to the touch input while the button is actuated is a filtering of a list. The touch input is not limited to taps, and can extend to any conceivable touch gesture, like a pinch gesture.

In some example embodiments the touch input is a touch and drag over text, and the response to the touch input while the button is actuated is a formatting of the text. Faster formatting of text is enabled by combining the selection touch input and the format selecting input.

In some example embodiments the touch input is a drag gesture, and the response to the touch input while the button is actuated is a zooming of displayed content. By performing a zoom action by combining touch input and keyboard input, the user is able to perform a zoom action that would normally require a larger amount of space on a touch-sensitive display, but instead needs smaller amount of space on the screen in conjunction with a single press on the keyboard.

In some example embodiments the response to the touch input while the button is actuated is dependent on how many of the buttons are actuated. By modifying the response to the touch input based on how many buttons are pressed, allows the user to modify the response with a simple input on the keyboard without having to concentrate on where the keys are being pressed, only how many are pressed. This reduces the amount of concentration required by the user to modify the touch input, allowing the user to divert more concentration to the touch input itself.

In some example embodiments the response to the touch input while the button is actuated is drawing a brush stroke on the display, and the size of the brush stroke corresponds to the number of buttons actuated.

In some example embodiments the response to the touch input while the button is actuated is dependent on detecting a pattern of button actuations. By modifying the touch input based on a pattern of button actuations allows for a larger number of possible responses, and potentially easing the burden on the user by relying on patterns (or gestures) rather than specific keyboard presses. For example, the user may swipe along the buttons to act as a modified rather than pressing a specific button.

In some example embodiments the pattern of button actuations is a swipe gesture across adjacent buttons, and the response to the touch input while the button is actuated is an increase in font size of a text selected by the touch input.

In some example embodiments the method further comprises detecting a release of the actuated button and performing a further action in response to the release of the actuated button.

In some example embodiments the keyboard and touch-sensitive display are fixed relative to each other within the electronic device. Electronic devices where the display and keyboard are fixed relative to one another, for example 'bar' type phones, have no means of concealing the keyboard when not in use. Even when text input is not required, the keyboard is visible and available to a user while operating on the touch-sensitive display. Therefore, the proposed solution may provide particular benefit to embodiments with fixed keyboard and display configurations, as it makes use of the keyboard as an extension of the touch input, even when not required as a keyboard as such.

In some example embodiments the electronic device is a cellular phone. The proposed solution may be particularly beneficial to cellular phones or mobile phones, as these devices are traditionally much more constrained in size. With this constraint in size there is often a trade-off between the amount of space allocated to a keyboard compared to the screen. However, the proposed solution allows both keyboard and screen to be provided, while still allowing the keyboard to contribute to the touch-inputs of the screen.

In some example embodiments the keyboard is touch-sensitive. Using a keyboard that is touch-sensitive may provide additional user-input options to the user. If the touch-sensitive keyboard is a capacitive keyboard, it may allow the user to provide gestures on the keyboard itself. If the touch-sensitive keyboard is a tactile keyboard, but with touch-sensitive properties, it provides the ability to combine presses of the physical components of the keyboard with touches and gestures of the touch-sensitive components of the keyboard. The capacitive sensor may be capable of detecting the presence of a finger, stylus or other pointing object even when not in physical contact with the sensor, but a distance away from it. Any mention of touch in the proposed solution would be equally applicable to such off-surface inputs and gestures.

In another embodiment, the present disclosure provides an electronic device including: a touch-sensitive display for receiving touch input; a keyboard comprising a plurality of buttons, wherein the keyboard and touch-sensitive display are fixed relative to each other within the electronic device; one or more processors; and memory comprising instructions which when executed by one or more of the processors cause the electronic device to perform the method of any of the steps described above.

In yet another embodiment, the present disclosure provides one or more computer readable media comprising instructions, which when executed by one or more of the processors of an electronic device having a touch-sensitive display for receiving touch input and a keyboard comprising a plurality of buttons, wherein the keyboard and touch-sensitive display are fixed relative to each other within the electronic device, cause the electronic device to operate in accordance with the method as claimed in any of the steps described above.

Reference will now be made to FIG. 1 which illustrates an electronic device 201 in which example embodiments described in the present disclosure can be applied.

In the illustrated example embodiment, the electronic device 201 is a communication device and, more particularly, is a mobile communication device having data and optionally voice communication capabilities, and the capability to communicate with other computer systems; for example, via the Internet.

Depending on the functionality provided by the electronic device 201, in various example embodiments the electronic device 201 may be a multiple-mode communication device configured for both data and voice communication, a mobile telephone such as a cellular phone, a wearable computer such as a watch, a tablet computer such as a slate computer, a personal digital assistant (PDA), or a computer system. The electronic device 201 may take other forms apart from those specifically listed above. The electronic device may also be referred to as a mobile communications device, a communication device, a mobile device and, in some cases, as a device.

The electronic device 201 includes a controller including one or more processors 240 (such as a microprocessor) which controls the overall operation of the electronic device 201. The processor 240 interacts with device subsystems such as a wireless communication subsystem 211 for exchanging radio frequency signals with a wireless network 101 to perform communication functions. The processor 240 is communicably coupled with additional device subsystems which may include any of the following or any combination thereof: one or more output interfaces 205 (such as a display 204 and/or a speaker 256 and/or electromagnetic (EM) radiation source 257), one or more input interfaces 206 (such as a camera 253, microphone 258, keyboard (208), control buttons (209), a navigational input device (not shown), and/or a touch-sensitive overlay (not shown)) associated with a touchscreen display 204, an orientation subsystem 249, memory (such as flash memory 244, random access memory (RAM) 246, read only memory (ROM) 248, etc.), auxiliary input/output (I/O) subsystems 250, a data port 252 (which may be a serial data port, such as a Universal Serial Bus (USB) data port), a near field communications (NFC) subsystem 265, a short-range communication subsystem 262 and other device subsystems generally designated as 264. Some of the subsystems shown in FIG. 1 perform communication-related functions, whereas other subsystems may provide "resident" or on-device functions.

In at least some example embodiments, the electronic device 201 may include a touchscreen display which acts as both an input interface 206 (i.e. touch-sensitive overlay) and an output interface 205 (i.e. display). The touchscreen display may be constructed using a touch-sensitive input surface which is connected to an electronic controller and which overlays the display 204. The touch-sensitive overlay and the electronic controller provide a touch-sensitive input interface 206 and the processor 240 interacts with the touch-sensitive overlay via the electronic controller. A touch-sensitive input need not be limited to detecting the touches of fingers, as they may be responsive to any means of touching, such as a stylus or a glove.

As noted above, in some example embodiments, the electronic device 201 may include a communication subsystem 211 which allows the electronic device 201 to communicate over a wireless network 101. The communication subsystem 211 includes a receiver 212, a transmitter 213, and associated components, such as one or more antenna elements 214 and 215, local oscillators (LOs) 216, and a processing module such as a digital signal processor (DSP) 217. The antenna elements 214 and 215 may be embedded or internal to the electronic device 201 and a single antenna may be shared by both receiver and transmitter. The particular design of the wireless communication subsystem 211 depends on the wireless network 101 in which electronic device 201 is intended to operate. The wireless network 101 may, for example, be a cellular (such as GSM, GPRS, CDMA and EDGE) and/or a non-cellular network (for example local WiFi networks).

In at least some example embodiments, the electronic device 201 may communicate with any one of a plurality of fixed transceiver base stations of the wireless network 101 within its geographic coverage area. The electronic device 201 may send and receive communication signals over the wireless network 101 after the required network registration or activation procedures have been completed. Signals received by the antenna 214 through the wireless network 101 are input to the receiver 212, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 217. In a similar manner, signals to be transmitted are processed, including modulation and encoding, for example, by the DSP 217. These DSP-processed signals are input to the transmitter 213 for digital-to-analog (D/A) conversion, frequency up conversion, filtering, amplification, and transmission to the wireless network 101 via the antenna 215. The DSP 217 not only processes communication signals, but may also provide for receiver and transmitter control. For example, the gains applied to communication signals in the receiver 212 and the transmitter 213 may be adaptively controlled through automatic gain control algorithms implemented in the DSP 217.

In some example embodiments, the auxiliary input/output (I/O) subsystems 250 may include an external communication link or interface; for example, an ethernet connection. The electronic device 201 may include other wireless communication interfaces for communicating with other types of wireless networks; for example, a wireless network such as an orthogonal frequency division multiplexed (OFDM) network. The auxiliary I/O subsystems 250 may include a vibrator for providing vibratory notifications in response to various events on the electronic device 201 such as receipt of an electronic communication or incoming phone call, or for other purposes such as haptic feedback (touch feedback).

In some example embodiments, the electronic device 201 also includes a removable memory module 230 (typically including flash memory, such as a removable memory card) and a memory interface 232. Network access may be associated with a subscriber or user of the electronic device 201 via the memory module 230, which may comprise a Subscriber Identity Module (SIM) card for use in a GSM network or other type of memory card for use in the relevant wireless network type. The memory module 230 is inserted in or connected to the memory card interface 232 of the electronic device 201 in order to operate in conjunction with the wireless network 101.

In at least some example embodiments, the electronic device 201 also includes a device orientation subsystem 249 including at least one orientation sensor 251 which is connected to the processor 240 and which is controlled by one or a combination of a monitoring circuit and operating software. The orientation sensor 251 detects the orientation of the device 201 or information from which the orientation of the device 201 can be determined, such as acceleration. In some example embodiments, the orientation sensor 251 comprises an accelerometer, such as a three-axis accelerometer. An accelerometer generally comprises a sensor which converts acceleration from motion (e.g. movement of the device 201 or a portion thereof due to the strike force) and gravity which are detected by a sensing element into an electrical signal (producing a corresponding change in output). Accelerometers may be available in one, two or three axis configurations. Higher order axis configurations are also possible. Accelerometers may produce digital or analog output signals depending on the type of accelerometer.

An orientation sensor 251 may generate orientation data which specifies the orientation of the electronic device 201. The orientation data, in at least some example embodiments, specifies the orientation of the device 201 relative to the gravitational field of the earth.

In some example embodiments, the orientation subsystem 249 may include other orientation sensors 251, instead of or in addition to accelerometers. For example, in various example embodiments, the orientation subsystem 249 may include a gravity sensor, a gyroscope, a tilt sensor, an electronic compass or other suitable sensor, or combinations thereof. In some example embodiments, the device orientation subsystem 249 may include two or more orientation sensors 251 such as an accelerometer and an electronic compass.

The electronic device 201 may also include a battery 238 as a power source, which is typically one or more rechargeable batteries that may be charged for example, through charging circuitry coupled to a battery interface 236 such as the data port 252. The battery 238 provides electrical power to at least some of the electrical circuitry in the electronic device 201, and the battery interface 236 provides a mechanical and electrical connection for the battery 238. The battery interface 236 is coupled to a regulator (not shown) which provides power V+ to the circuitry of the electronic device 201.

The electronic device 201 stores data 227 in an erasable persistent memory, which in one example embodiment is the flash memory 244. In various example embodiments, the data 227 includes service data including information required by the electronic device 201 to establish and maintain communication with the wireless network 101. The data 227 may also include user application data such as messages, address book and contact information, calendar and schedule information, notepad documents, image files, and other commonly stored user information stored on the electronic device 201 by its user, and other data. The data 227 stored in the persistent memory (e.g. flash memory 244) of the electronic device 201 may be organized, at least partially, into one or more databases or data stores. The databases or data stores may contain data items of the same data type or associated with the same application. For example, messages, contact records, and task items may be stored in individual databases within the device memory.

The electronic device 201 may, in some example embodiments, be a mobile communication device which may provide two principal modes of communication: a data communication mode and a voice communication mode. In the data communication mode, a received data signal such as a message, or Web page download will be processed by the communication subsystem 211 and input to the processor 240 for further processing. For example, a downloaded Web page may be further processed by a browser application or an email message may be processed by an email messaging application and output to the display 204. A user of the electronic device 201 may also compose data items, such as email messages, instant messages, or other messages; for example, using the input devices in conjunction with the display 204. These composed items may be transmitted through the communication subsystem 211 over the wireless network 101.

In the voice communication mode, the electronic device 201 provides telephony functions and may operate as a cellular phone. The overall operation is similar, except that the received signals would be output to the speaker 256 and signals for transmission would be generated by a transducer such as the microphone 258. The telephony functions are provided by a combination of software/firmware (i.e., a voice communication module) and hardware (i.e., the microphone 258, the speaker 256 and input interfaces 206). Alternative voice or audio I/O subsystems, such as a voice message recording subsystem, may also be implemented on the electronic device 201. Although voice or audio signal output is typically accomplished primarily through the speaker 256, the display screen 204 may also be used to provide an indication of the identity of a calling party, duration of a voice call, or other voice call related information.

The processor 240 operates under stored program control and executes software modules 221 stored in memory such as persistent memory; for example, in the flash memory 244. As illustrated in FIG. 1, the software modules 221 include operating system software 223 and other software applications 225 such a user interface (UI) module. In the example embodiment of FIG. 1, the UI module is implemented as a stand-alone application 225. However, in other example embodiments, the UI module could be implemented as part of the operating system 223 or another application 225 or collection of applications.

Figure 2:
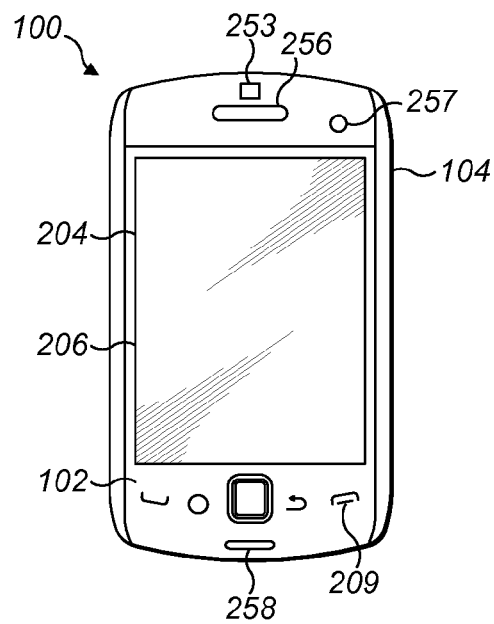
FIG. 2 is a front view of a phone in accordance with example embodiments of the present disclosure.

Referring now to FIG. 2, the electronic device 201 may be a cellular (or mobile) phone 100. For example, the phone 100 may have the ability to run third party applications which are stored on the phone.

The phone 100 may include the components discussed above with reference to FIG. 1 or a subset of those components. The phone 100 includes a housing 104 which houses at least some of the components discussed above with reference to FIG. 1.

In the example embodiment illustrated, the phone includes a display 204, which may comprise a touchscreen display which acts as an input interface 206. The display 204 is disposed within the phone 100 so that it is viewable at a front side 102 of the phone 100. That is, a viewable side of the display 204 is disposed on the front side 102 of the phone. In the example embodiment illustrated, the display 204 is framed by the housing 104.

The example phone 100 may also include other input interfaces 209 such as one or more buttons, keys or navigational input mechanisms. In the example illustrated, at least some of these additional input interfaces 209 are disposed for actuation at a front side 102 of the phone. However, the principle mode of user interaction in the example phone 100 is with the touch-sensitive display 204, if the user wishes to enter text or other characters, the touch-sensitive display 204 may display a virtual keyboard, also referred to as a software keyboard.

Figure 3:
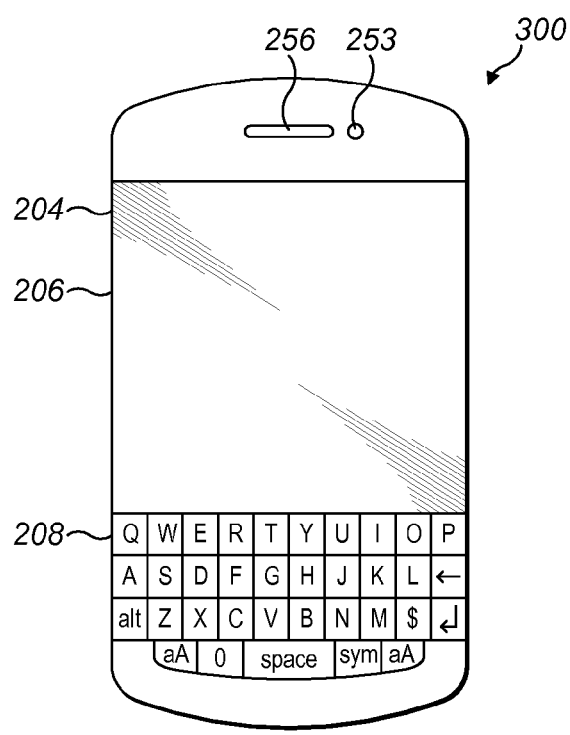
FIG. 3 is a front view of a phone with a hardware keyboard in accordance with example embodiments of the present disclosure.

Referring now to FIG. 3, the example phone 300 comprises a display 204 that is touch sensitive 206 and also a hardware keyboard 208 acting as an input interface. Each button on the hardware keyboard may, for example, be an individually depressible button, or may be a touch-sensitive button, such as a capacitive button, or a combination of both. The hardware keyboard 208 may be separate from the display 204 such that the display 204 may change the appearance of any pixel on the display, but may not alter the appearance of the hardware keyboard, which may change in appearance independently of the display, for example with a backlight.

The hardware keyboard 208 may provide a button for each of the letters Latin-derived alphabet and additional functional buttons such as a space bar or delete button. The hardware keyboard 208 may provide a button for each of the numbers 0 to 9 in addition to the letters, or may take the form of a keypad by providing buttons for each of the number 0 to 9, with a few additional functional buttons also provided.

The example phone 300 has a 'bar' form factor, also referred to as a 'slab', 'block' or 'slate' phone. In a bar-type phone, the touch-sensitive display 204 and other input interfaces like a keyboard 208 are normally fixed to the front of the device. In contrast, flip phone and slider phone form factors are designed so that the display and keyboard are movable relative to each other, with the display on flip phones designed to rotate about an axis to either cover or expose the keyboard, and with the keyboard on a slider phone sliding out from behind the display to reveal itself when required.

The 'bar' form factor is often preferred, as with fewer moving parts it can be cheaper to manufacturer and less likely to break. The tar' form factor can also lead to much thinner and more compact phones than phones with moving parts and so can achieve greater portability.

However, without any moving parts on a bar-type phone, the keyboard and display need to both be fixed on the front of the phone so that the user can both view the display and access the keyboard at the same time. Bar-type phones are often characterised by having a keyboard and display fixed relative to each other, preferably within the same plane and facing the same direction, and fixed within a single enclosure. This introduces the problem that there is only a fixed amount of space on the front of the phone, so the more space on the front of the phone that is dedicated to a keyboard, the less space available for a display.

The touch-sensitive display 204 provides useful functionality to a phone, such as displaying a graphical user interface, to provide the user with displayed menu options to select from. In the example phone 100 of FIG. 2, the touch sensitive display covers most of the front 104 of the device, and so there would be enough space on the display 204 for displaying both content and the menu options of a graphical user interface. However, in the example phone 300 where a dedicated keyboard 208 is also provided, there would be less screen real estate available on the display 204. Traditionally, smaller screens like the display 204 of FIG. 3 would attempt to display available menu options and content on the smaller screen, thereby resulting in a cramped layout with the amount of content visible limited by the display of the graphical user interface.

The proposed solution provides a way of reducing the amount of screen space required for displaying graphical user interface options and for increasing the amount of content that can be displayed.

Figure 4:
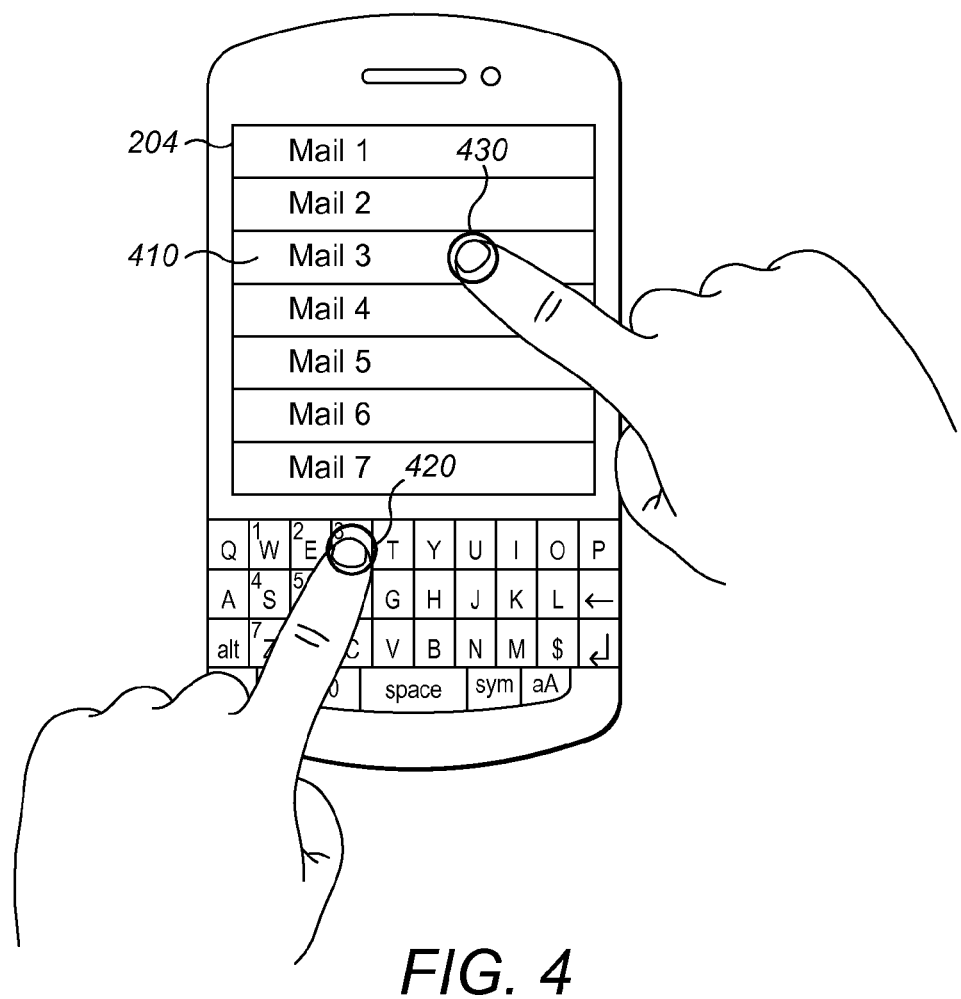
FIG. 4 illustrates a mode of interaction for performing actions on content in accordance with the present disclosure.

FIG. 4 illustrates an example use case of the proposed solution. The device in FIG. 4 comprising a touch-sensitive display 204 and a keyboard 208 is displaying a mailing application on the display 204. In the mailing application, a list of content items (emails) is displayed on the display 204. In order to perform an action on one of these emails 410, traditional touchscreen phones would overlay a number of menu options, obscuring the list of emails, displaying these menu options in a toolbar within the application or as a context menu, for example. Rather than reduce the amount of screen real estate on the device by displaying such menu options, the proposed solution utilises the keyboard buttons that are already present on the dedicated keyboard 420 to provide menu options without obscuring the display 204.

In order to perform an action on an email item 410, for example marking it as 'read', the user actuates the 'R' key 420 on the keyboard 208, and while doing so touches 430 the email item 410 to indicate which email to perform the action on. In response to this combination of user input, the email item 410 is marked as read. The user may continue holding the button 420 and continue tapping on other email items to mark those as read as well. The action may be performed the moment the two required user inputs are detected, or it may only perform the action once the keyboard button 420 has been released, allowing the user to tap on multiple email items before performing the action on those email items concurrently.

If the user had touched 430 the email item 410 without holding the keyboard button 420, the action performed may be different. Performing only a tap 430 on an email item 410 may select it or open it, for example. By holding down the keyboard button, it acts as a modifier, altering the response to any further touch input received while the button is being held.

Actuating different keyboard buttons may trigger different responses when touch input is received. In the example of FIG. 4, holding 'R' while tapping emails marks them as read, but other use cases could include holding a delete key whiling tapping emails to delete them, or holding the 'F' key while tapping emails to flag them as important, for example.

The order of user input need not be limited to detecting the keyboard button actuation first. The user could perform a touch input on the mail icon and then actuate the keyboard button to trigger the response. For example, holding down the mail icon selects it but does not perform an action; releasing the touch could result in the email opening, but if the 'R' key is actuated before releasing the touch, the email would be marked as read instead.

Most menu options that would normally be displayed on the display 204, can be provided on the keyboard itself, allowing the amount of space dedicated to content on the display 204 to be much larger compared to the amount of space reserved for displaying selectable functions.

Using the dedicated keyboard 208 rather than displayed menu options on a touch-sensitive display may be advantageous. Physical keyboards, particularly those which provide tactile feedback, can allow for more precise key presses than touchable icons. In the example phone 300, 35 physical keys are provided on the keyboard 208, providing potentially 35 different menu options. Had the front of the device been predominantly a touchscreen, providing this many icons in the same area would not be desirable, as the known inaccuracies of touch-detection would make it difficult to rely upon the user's ability to distinguish between the different icons when entering a touch.

Figure 5:
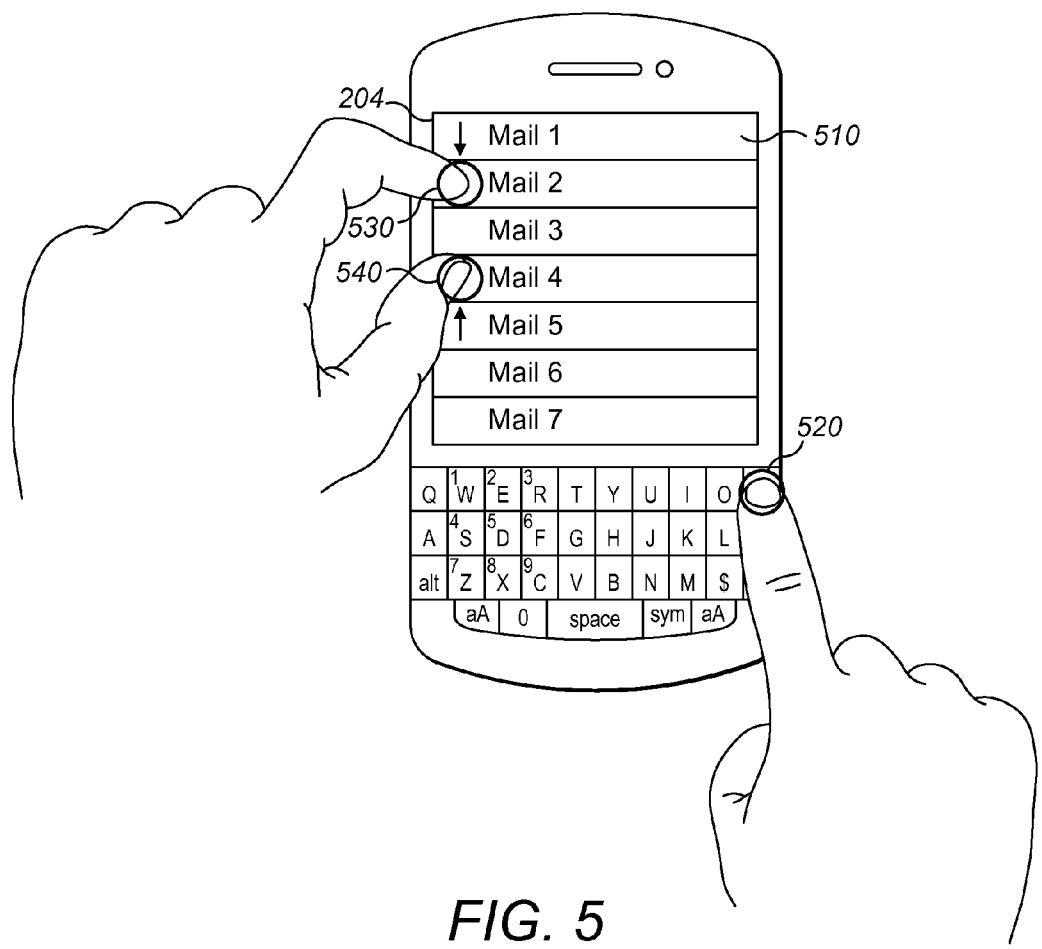
FIG. 5 illustrates a mode of interaction for filtering a list in accordance with the present disclosure.

FIG. 5 illustrates a further use case, showing how gestures other than taps can be provided as the touch input. In this example, the pinch gesture is modified by actuating one of the keyboard buttons. The pinch gesture involves placing a first 530 and second 540 finger on the touch-sensitive display 204 and then dragging the two fingers together on the touchscreen. When performing a pinch gesture on its own, content may be zoomed in or out, but when holding down the 'P' key 520, for example, the device may respond by filtering the list of email items 510 so that low priority emails are not displayed. If the user held down on the 'U' key instead, performing a pinch gesture may filter the list to only display unread messages.

Figure 6:
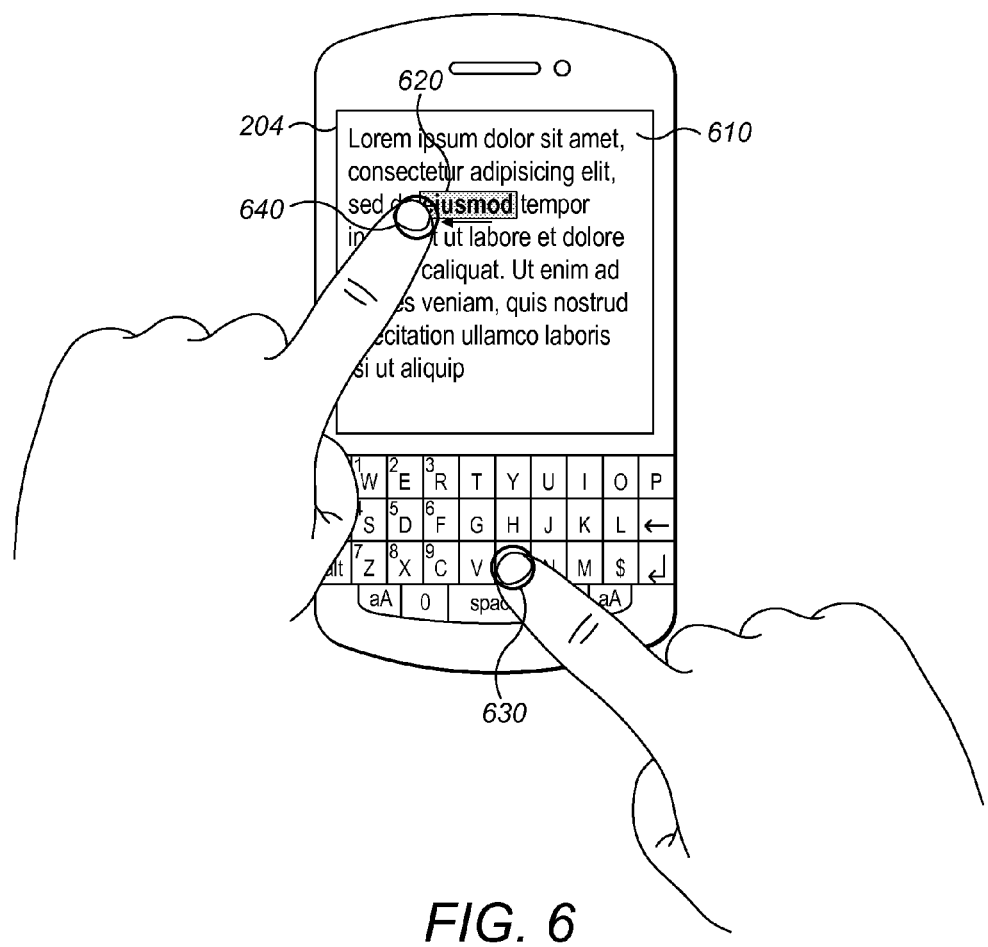
FIG. 6 illustrates a mode of interaction for modifying text in accordance with the present disclosure.

FIG. 6 illustrates another use case of the proposed solution. An application is shown displaying text 610 on the touch-sensitive display 204. If a user performs a long press on one of the words, the word may become highlighted and the user may continue dragging their touch to adjust which letters or words are included in the selected region. The example shown in FIG. 6 shows a fast way of performing an action on selected content while in the process of selecting the content. Once the user has selected 620 the text with the touch input, the user may immediately format the text to a bold font by actuating the 'B' keyboard key 630. The user may actuate keyboard keys 'I' and 'U' instead to cause the highlighted to text 620 to become italicised or underlined, respectively.

Performing a sequence of keyboard presses, may cause a sequence of corresponding actions. For example, once the user has selected the text 620, while still maintaining the touch if the user actuated keyboard key 'B' and then 'U', the highlighted text 620 would become bold and then would also become underlined. Alternatively, performing a sequence of keyboard presses while still maintaining the touch input could undo the action corresponding to the earlier key press and perform the action corresponding to the later key press instead. For example, while touch the selected text 620, actuating 'B' may turn the text bold, but then actuating 'U' while still maintaining the touch could remove the bold font and make the text 620 underlined instead.

The keyboard 208 is primarily used for entering text, so in a text processing application 610, the keyboard should be able to enter text as well as act as a modifier for touch input. Simply actuating the 'B' keyboard button, would add the letter B to the text application 610, but doing so in conjunction with touch input, would trigger the behaviour of the proposed solution.

Figure 7:
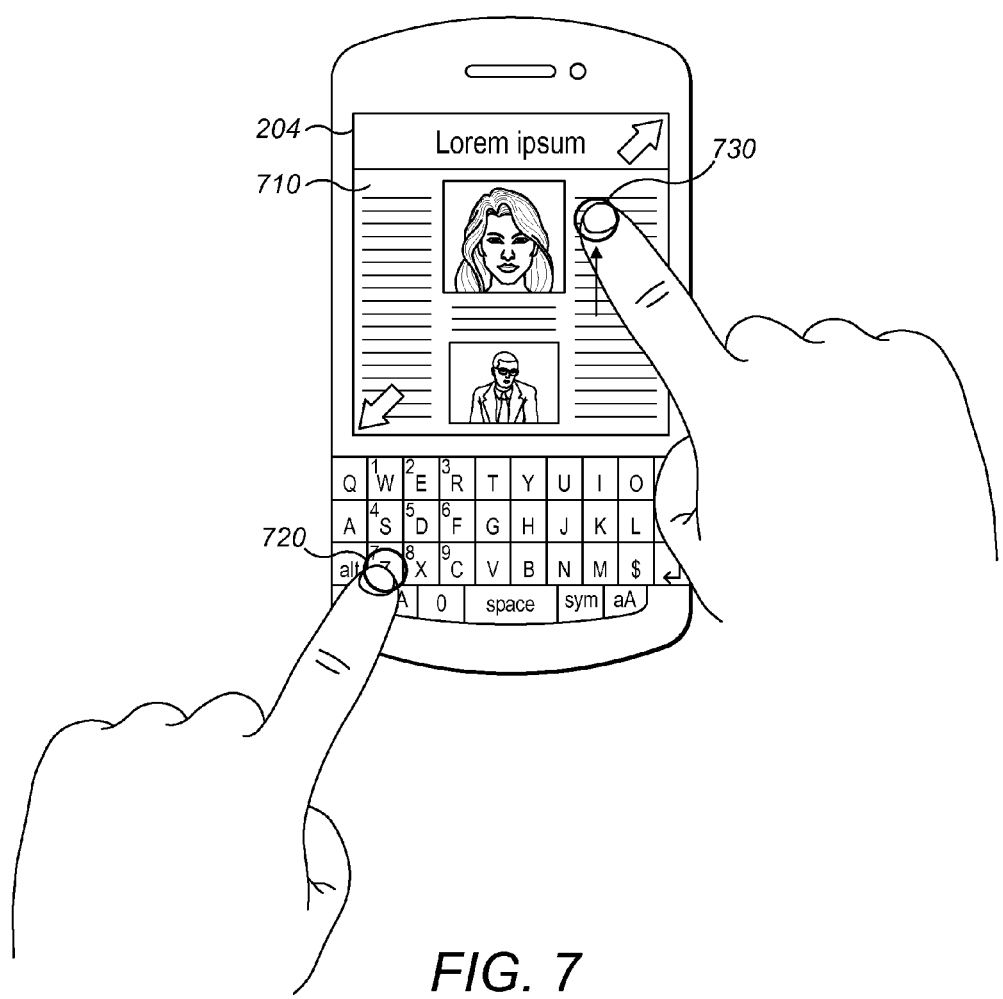
FIG. 7 illustrates a mode of interaction for zooming in and out of content in accordance with the present disclosure.
Figure 8:
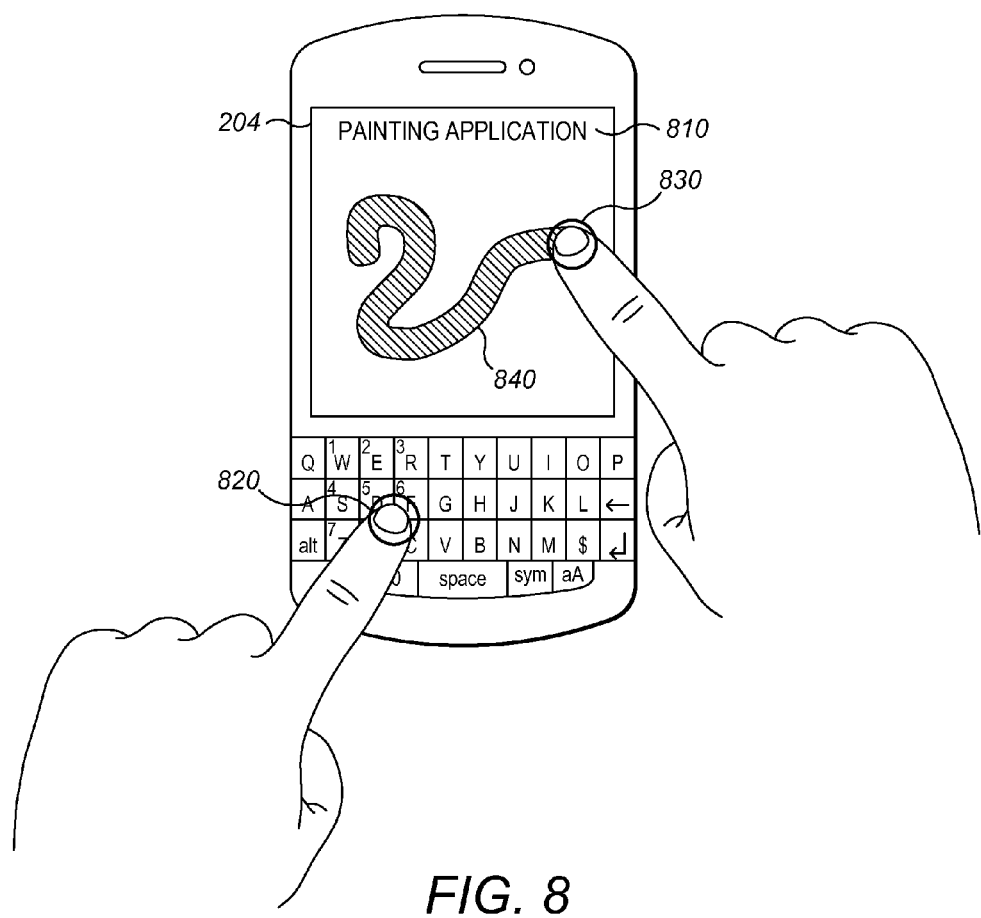
FIG. 8 illustrates a mode of interaction modifying a drawing input in accordance with the present disclosure.

FIG. 7 illustrates a further use case for the proposed solution. Zooming in and out can be performed by performing a pinch gesture on the touch-sensitive display 204. However, when the display is small, performing such a pinch gesture may be difficult, especially if pinching out (also known as punching). Therefore, rather than placing two fingers on the touch-sensitive display, one is placed 730 on the touch sensitive-display 204 and the other is placed on keyboard button 720, essentially emulating a second finger in a pinch gesture. In this example, actuating the 'Z' key and sliding a touch 730 on the touch-sensitive display 710 can cause content 710 displayed to be zoomed in and zoomed out. For example, sliding the touch 730 to the top right of the display 204 can cause zooming in, while sliding the touch 730 to the bottom left of the display 204 can cause zooming out FIG. 8 illustrates another use case for the proposed solution, in this example showing a painting or drawing application 810. Dragging a touch 830 around the touch-sensitive display 204 in a drawing application 810 may cause a stroke 840 to be drawn. To change the brush properties, the user could actuate a keyboard button, such as '1' to set a lowest brush size. The user may also change brush sizes by actuating multiple buttons 820 at the same time, with the more buttons pressed, the larger the brush size used. While the user is performing the stroke 830, the user could change how many keyboard buttons are actuated to dynamically change the brush size as the stroke is taking place.

The use cases illustrated in the figures are only a few examples of the embodiments envisioned by the proposed solutions. The proposed solution may be used for a variety of different applications and combinations of touch gestures and keyboard interactions.

A further example is where the keyboard interactions are in the form of a gesture. Like in FIG. 6, the user may have selected text 640 through touch input on the touch-sensitive display 204. To increase the font size, the user could perform a swiping gesture over the keyboard itself while maintaining the touch on the display 204. Such a swiping gesture may be performed over a touch-sensitive keyboard, or may involve actuating adjacent physical keys on a keyboard by pressing a finger on one key and sliding the finger along. The further away the finger swipes from the initial key, the larger the font of the selected text.

Embodiments where gestures on a keyboard are combined with touch gestures on the touch-sensitive display 204, may be particularly useful in electronic devices where the keyboard itself is touch-sensitive. For example, if the keyboard is a capacitive keyboard, it may be simple for a user to perform gestures on it, so providing interactions using a touch-gesture on the keyboard to act as a modified to touch-input received at the touch-sensitive display may be beneficial.

The keyboard may be both tactile and touch-sensitive. For example, the keyboard may include an array of depressible buttons, but under or above the buttons is a touch-sensitive layer that can detect touch on the keyboard, with a finer resolution than possible with individually depressible buttons alone. This may allow further combinations of user input at the keyboard, such as beginning a user input with a touch (e.g. capacitive touch) on a key at the keyboard before ending with a mechanical press of a key at the keyboard, or in the opposite order. Gestures performed on the keyboard, detected by the keyboard's touch-sensitive layer, may be combined with mechanical presses on the keys to modify touch-input received at the touch-sensitive display 204, for example. Examples of touch-sensitive technology may include resistive sensing, capacitive elements using self-capacitance to interpolate finger positions between two or more sensors, and capacitive elements using dual capacitance to determine specific positions, for example.

Another example may involve the user pressing an 'F' (for font) or 'S' (for size) key on a keyboard 208 in a word processing application to affect the cursor setting for text that has not yet been written. In this example, the user may perform a long press on the 'F' or 'S' keyboard key and then move their finger over the touch-sensitive display 204 to modify the font size or switch between fonts of an array of available fonts. In a similar example, holding down the 'F' keyboard key on a word processing application modifies any further touch input such that performing a drag on the touch-sensitive display 204 displays a list of available fonts that the user can swipe between with their touch input while actuating the 'F' keyboard button. In this example, the keyboard key is acting to trigger the display of a menu, but only in conjunction with touch input.

In another example, the proposed solution could be used in an application comprising a list of content items, such as an image browser. Actuating the 'S' key may trigger a multiple select mode, so that any displayed content items tapped on in the touch-sensitive display are selected in addition to any other content items tapped on while the 'S' key is actuated. Releasing the 'S' key may cause the device to display a menu of options that can now be performed on the selected content, for example deleting and moving.

It is to be understood that the present disclosure includes permutations of combinations of the optional features set out in the embodiments described above. In particular, it is to be understood that the features set out in the appended dependent claims are disclosed in combination with any other relevant independent claims that may be provided, and that this disclosure is not limited to only the combination of the features of those dependent claims with the independent claim from which they originally depend.

The invention claimed is:

1. A method comprising:
   at an electronic device including a touch-sensitive display for receiving touch input and a keyboard comprising a plurality of keyboard buttons, wherein the keyboard is a hardware keyboard separate from the touch-sensitive display, performing:
   detecting actuation comprising pressing of a keyboard button on at least one of the plurality of keyboard buttons;
   detecting a touch input at the touch-sensitive display while the keyboard button remains pressed;
   modifying a response to the touch input to process the touch input as a different touch input, responsive to detecting the touch input while the keyboard button remains pressed;
   responding to the touch input, wherein an action performed in response to the touch input occurring while the keyboard button is actuated is different from an action performed in response to a same touch input detected while the keyboard button is not actuated.

2. The method of claim 1, wherein response to the touch input while the keyboard button is actuated is dependent on which of the plurality of keyboard buttons is actuated.

3. The method of claim 1, wherein the action performed in response to the touch input while the keyboard button is not actuated is a first action on a content item, and the action performed in response to the touch input while the keyboard button is actuated comprises a second action on the content item.

4. The method of claim 1, wherein the touch input is a pinch gesture, and the action performed in response to the touch input while the keyboard button is actuated is a filtering of a list.

5. The method of claim 1, wherein the touch input is a touch and drag over text, and the action performed in response to the touch input while the keyboard button is actuated is a formatting of the text.

6. The method of claim 1, wherein the touch input is a drag gesture, and the action performed in response to the touch input while the keyboard button is actuated is a zooming of displayed content.

7. The method of claim 1, wherein the action performed in response to the touch input while the keyboard button is actuated is dependent on how many of the keyboard buttons are actuated.

8. The method of claim 1, wherein the action performed in response to the touch input while the keyboard button is actuated is dependent on detecting a pattern of keyboard button actuations.

9. The method of claim 8, wherein the pattern of keyboard button actuations is a swipe gesture across adjacent keyboard buttons, and the action performed in response to the touch input while the keyboard button is actuated is an increase in font size of a text selected by the touch input.

10. The method of claim 1, further comprising detecting a release of an actuated keyboard button and performing a further action in response to the release of the actuated keyboard button.

11. The method of claim 1, wherein the keyboard and touch-sensitive display are fixed relative to each other within the electronic device.

12. The method of claim 1, wherein the electronic device is a cellular phone.

13. The method of claim 1, wherein the keyboard is touch-sensitive.

14. An electronic device including:
a touch-sensitive display for receiving touch input;
a keyboard comprising a plurality of keyboard buttons, wherein the keyboard is a hardware keyboard separate from the touch-sensitive display;
one or more processors; and
memory comprising instructions which when executed by one or more of the processors cause the electronic device to:
  detect actuation comprising pressing of a keyboard button on at least one of the plurality of keyboard buttons;
  detect a touch input at the touch-sensitive display while the keyboard button remains pressed;
  modify a response to the touch input to process the touch input as a different touch input, responsive to detecting the touch input while the keyboard button remains pressed; and
  respond to the touch input, wherein an action performed in response to the touch input occurring while the keyboard button is actuated is different from an action performed in response to a same touch input detected while the keyboard button is not actuated.

15. The electronic device of claim 14, wherein the action performed in response to the touch input while the keyboard button is actuated is dependent on which of the plurality of keyboard buttons is actuated.

16. The electronic device of claim 14, wherein the action performed in response to the touch input while the keyboard button is not actuated is a first action on a content item, and the action performed in response to the touch input while the keyboard button is actuated comprises a second action on the content item.

17. The electronic device of claim 14, wherein the touch input is a touch and drag over text, and the response to the touch input while the keyboard button is actuated is a formatting of the text.

18. The electronic device of claim 14, wherein the action performed in response to the touch input while the keyboard button is actuated is dependent on how many of the keyboard buttons are actuated.

19. The electronic device of claim 14, wherein the action performed in response to the touch input while the keyboard button is actuated is dependent on detecting a pattern of keyboard button actuations.

20. The electronic device of claim 19, wherein the pattern of keyboard button actuations is a swipe gesture across adjacent keyboard buttons, and the action performed in response to the touch input while the keyboard button is actuated is an increase in font size of a text selected by the touch input.

21. The electronic device of claim 14, wherein the memory comprises further instructions which when executed cause the electronic device to detect a release of an actuated keyboard button and performing a further action in response to the release of the actuated keyboard button.

22. The electronic device of claim 14, wherein the keyboard and touch-sensitive display are fixed relative to each other within the electronic device.

23. The electronic device of claim 14, wherein the electronic device is a cellular phone.

24. The electronic device of claim 14, wherein the keyboard is touch-sensitive.

25. One or more computer readable media comprising instructions, which when executed by one or more of the processors of an electronic device having a touch-sensitive display for receiving touch input and a keyboard comprising a plurality of keyboard buttons, wherein the keyboard is a hardware keyboard separate from the touch-sensitive display, cause the electronic device to:
  detect actuation comprising pressing of a keyboard button on at least one of the plurality of buttons;
  detect a touch input at the touch-sensitive display while the keyboard button remains pressed;
  modify a response to the touch input to process the touch input as a different touch input, responsive to detecting the touch input while the keyboard button remains pressed; and
  respond to the touch input, wherein an action performed in response to the touch input occurring while the keyboard button is actuated is different from an action performed in response to a same touch input detected while the keyboard button is not actuated.

* * * * *